(12) United States Patent
Patel et al.

(10) Patent No.: US 7,681,398 B2
(45) Date of Patent: Mar. 23, 2010

(54) COMBUSTOR LINER AND HEAT SHIELD ASSEMBLY

(75) Inventors: Bhawan B. Patel, Mississauga (CA);
 Lorin Markarian, Etobicoke (CA);
 Stephen Phillips, Etobicoke (CA);
 Eduardo Hawie, Woodbridge (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 662 days.

(21) Appl. No.: 11/561,042

(22) Filed: Nov. 17, 2006

(65) Prior Publication Data

US 2008/0115506 A1 May 22, 2008

(51) Int. Cl.
*F02C 1/00* (2006.01)
*F02G 3/00* (2006.01)

(52) U.S. Cl. .......................... 60/752; 60/756
(58) Field of Classification Search .................. 60/804, 60/752–760, 748, 740
See application file for complete search history.

(56) References Cited

U.S. PATENT DOCUMENTS

| | | | |
|---|---|---|---|
| 2,669,090 A | 2/1954 | Jackson | |
| 3,169,367 A | 2/1965 | Hussey | |
| 3,608,309 A | 9/1971 | Hill et al. | |
| 4,226,088 A | 10/1980 | Tsukahara et al. | |
| 4,246,757 A | 1/1981 | Heberling | |
| 4,246,758 A | 1/1981 | Caruel et al. | |
| 4,475,344 A | 10/1984 | Mumford et al. | |
| 4,590,769 A | 5/1986 | Lohmann et al. | |
| 4,702,073 A | 10/1987 | Melconian | |
| 4,870,818 A | 10/1989 | Suliga | |
| 4,914,918 A | 4/1990 | Sullivan | |
| 4,934,145 A | 6/1990 | Zeisser | |
| 5,117,637 A | 6/1992 | Howell et al. | |
| 5,129,231 A | 7/1992 | Becker et al. | |
| 5,165,226 A | 11/1992 | Newton et al. | |
| 5,222,358 A | 6/1993 | Chaput et al. | |
| 5,253,471 A | 10/1993 | Richardson | |
| 5,271,219 A | 12/1993 | Richardson | |
| 5,307,637 A | 5/1994 | Stickles et al. | |
| 5,353,865 A | 10/1994 | Adiutori et al. | |
| 5,396,759 A * | 3/1995 | Richardson | 60/804 |
| 5,398,509 A | 3/1995 | North et al. | |
| 5,419,115 A * | 5/1995 | Butler et al. | 60/804 |
| 5,590,531 A | 1/1997 | Desaulty et al. | |
| 5,894,732 A * | 4/1999 | Kwan | 60/756 |
| 5,934,066 A | 8/1999 | Schmid et al. | |
| 5,956,955 A * | 9/1999 | Schmid | 60/748 |
| 5,974,805 A | 11/1999 | Allen | |
| 5,996,335 A | 12/1999 | Ebel | |
| 6,032,457 A | 3/2000 | McKinney et al. | |
| 6,164,074 A | 12/2000 | Madden et al. | |
| 6,427,446 B1 | 8/2002 | Kraft et al. | |

(Continued)

FOREIGN PATENT DOCUMENTS

EP 0 774 100 B1 9/1998

(Continued)

*Primary Examiner*—William H Rodríguez
(74) *Attorney, Agent, or Firm*—Ogilvy Renault LLP

(57) ABSTRACT

Impingement hole patterns are provided in a combustor dome panel to provide efficient cooling of a combustor dome heat shield. The impingement holes are substantially aligned or located above partial height protuberances provided on the back face of the heat shield.

29 Claims, 8 Drawing Sheets

U.S. PATENT DOCUMENTS

| | | | |
|---|---|---|---|
| 6,497,105 B1 * | 12/2002 | Stastny | 60/796 |
| 6,557,349 B1 | 5/2003 | Young et al. | |
| 6,655,027 B2 | 12/2003 | Kastrup et al. | |
| 6,672,073 B2 | 1/2004 | Wiebe | |
| 6,679,063 B2 | 1/2004 | Ebel | |
| 6,751,961 B2 * | 6/2004 | Pacheco-Tougas et al. | 60/752 |
| 6,792,757 B2 | 9/2004 | Borns et al. | |
| 6,842,980 B2 | 1/2005 | Young et al. | |
| 6,986,253 B2 | 1/2006 | Leen et al. | |
| 7,093,439 B2 * | 8/2006 | Pacheco-Tougas et al. | 60/752 |
| 7,363,763 B2 * | 4/2008 | Coughlan, III et al. | 60/752 |
| 2003/0213249 A1 | 11/2003 | Pacheco-Tougas et al. | |
| 2008/0104962 A1 * | 5/2008 | Patel et al. | 60/752 |
| 2008/0282703 A1 * | 11/2008 | Morenko et al. | 60/796 |

FOREIGN PATENT DOCUMENTS

| | | |
|---|---|---|
| EP | 0 797 746 B1 | 5/1999 |
| EP | 0 797 748 B1 | 5/1999 |
| EP | 0 823 035 B1 | 2/2000 |
| EP | 1 148 299 A1 | 10/2001 |
| EP | 0 837 286 B1 | 10/2002 |
| EP | 0 816 761 B1 | 9/2003 |
| EP | 1 193 451 B1 | 1/2005 |
| WO | WO 95/30115 | 11/1995 |

* cited by examiner

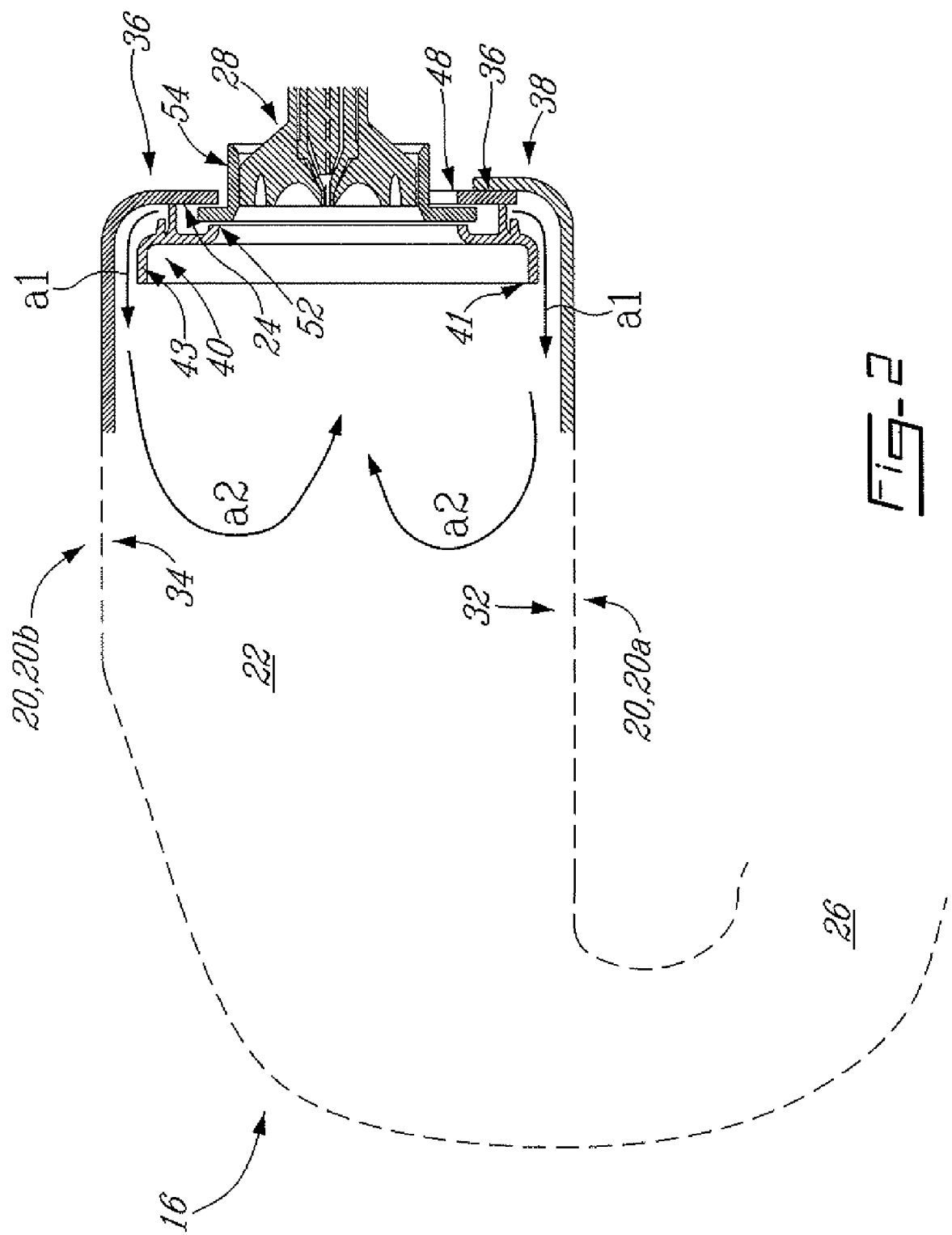

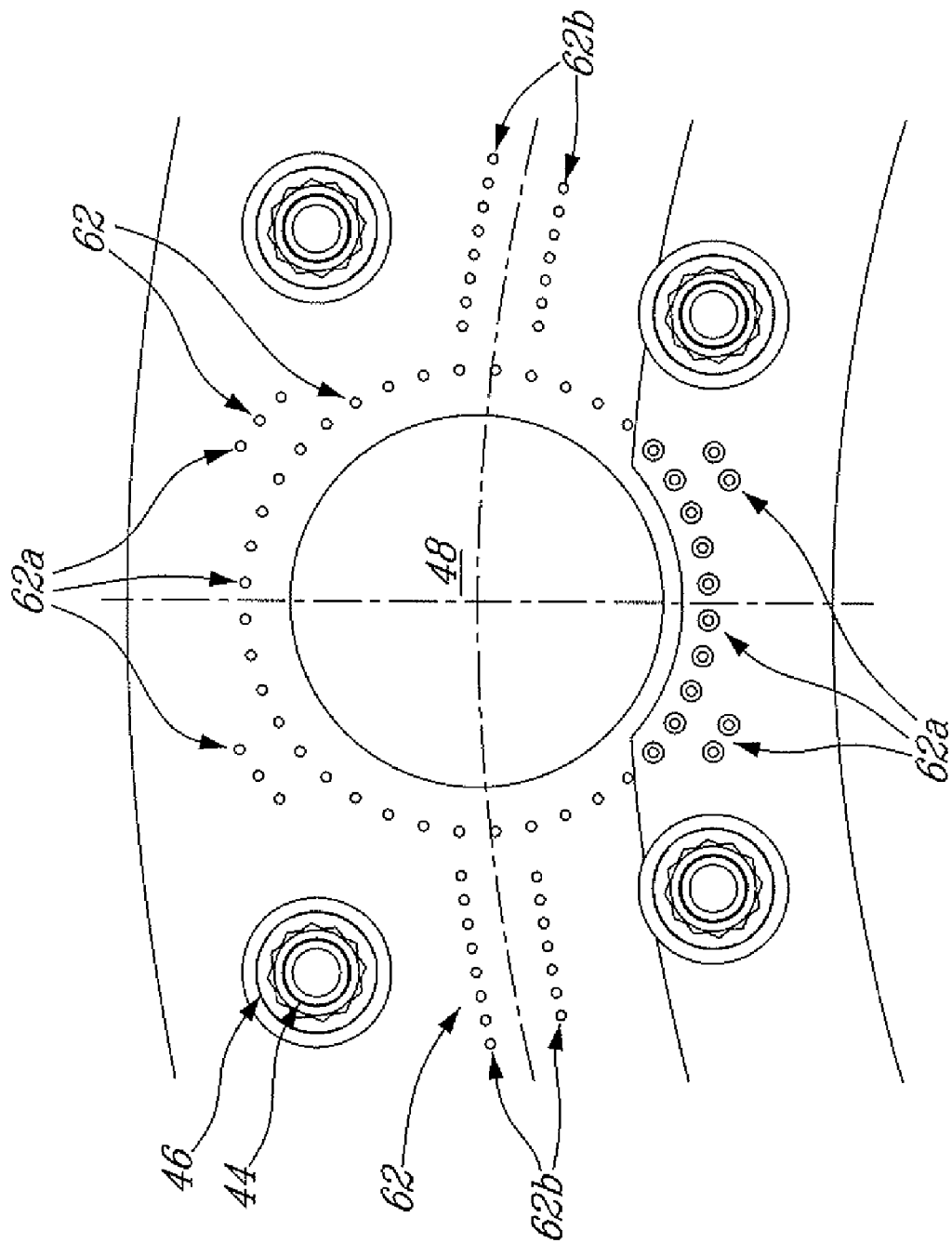

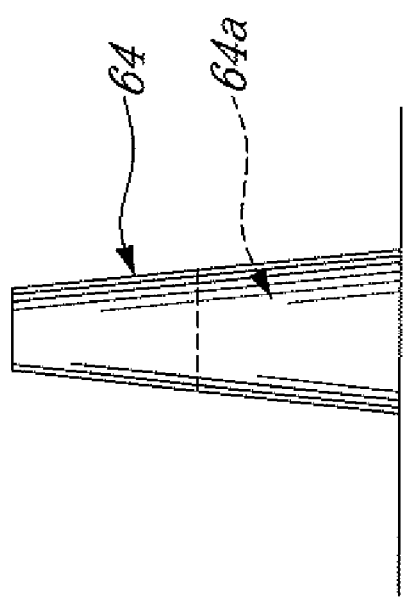
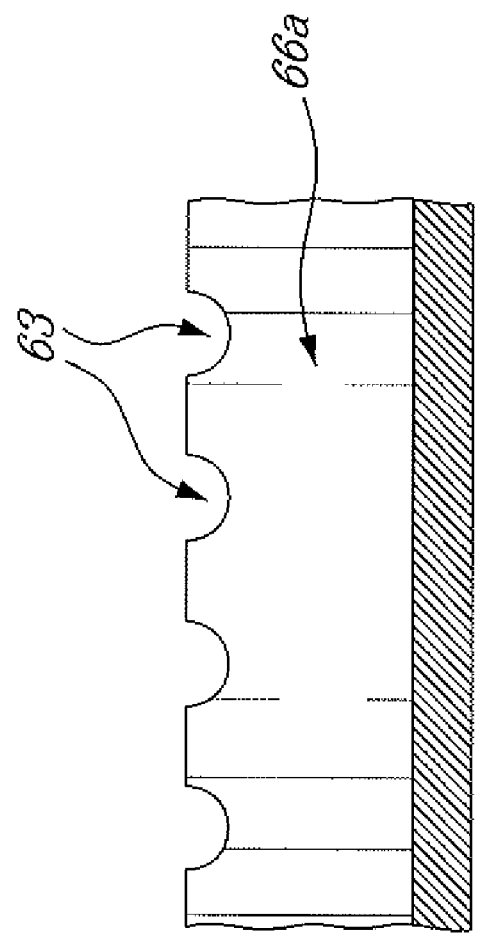

US 7,681,398 B2

COMBUSTOR LINER AND HEAT SHIELD ASSEMBLY

TECHNICAL FIELD

The invention relates generally to gas turbine engine combustors and, more particularly, to combustor heat shield cooling.

BACKGROUND OF THE ART

Heat shields, which protect the dome panel of combustor shells, are exposed to hot gases in the primary combustion zone. The amount of coolant available for cooling the heat shields must be minimized to improve the combustion efficiency and to reduce the smoke, unburned hydrocarbon and CO/NOx emission. Example heat shields are shown in U.S. Pat. Nos. 4,934,145 and 5,419,115.

There is a continuing need for improved heat shields and cooling schemes.

SUMMARY

In one aspect, there is provided a combustor and dome heat shield assembly comprising a plurality of heat shield sectors mounted adjacent and spaced apart a distance from an annular dome of the combustor, each heat shield sector having a heat shield body defined between opposed lateral edges and radially inner and outer edges, at least one fuel nozzle opening defined in the heat shield body, the heat shield body having a back face facing the combustor dome, the back face having a first plurality of protuberances extending from the back face to a first height, the first height being substantially equal to said distance, the back face having a second plurality of protuberances extending from the back face to a second height, the second height being less than the first height, the combustor having a plurality of impingement cooling holes defined through the dome, the impingement cooling holes substantially aligned with the second plurality of protuberances.

In a second aspect, there is provided a combustor dome comprising at least one heat shield mounted to an annular dome panel, the at least one heat shield and the dome panel defining an air space therebetween and at least one fuel nozzle opening for receiving a fuel nozzle, a plurality of impingement holes defined in said dome panel for causing an impingement fluid to impinge upon a back face of the at least one heat shield, the back face having a heat exchange promoting protuberance pattern thereon, said pattern being divided in regions by ribs projecting outwardly from said back face, said ribs including a first rib extending around said fuel nozzle opening and circumscribing a central annular area and a second rib extending from opposed sides of the first rib towards lateral edges of the at least one heat shield, the heat exchange promoting protuberance pattern including first and second set of protuberances, the protuberances of the second set being shorter than the protuberances of the first set and located at least partly outwardly of the central annular area adjacent to the first rib and adjacent to the second rib on either sides thereof, and wherein the impingement holes are substantially aligned with the second set of protuberances.

Further details of these and other aspects will be apparent from the detailed description and figures included below.

DESCRIPTION OF THE DRAWINGS

Reference is now made to the accompanying figures, in which:

FIG. 2 is an enlarged view of a combustor shell of the engine combustor shown in FIG. 1;

FIG. 3 is an outside end view of the dome panel of the combustor shell, illustrating an impingement hole pattern;

FIG. 6 is a sectional view of the portion of FIG. 5 indicated 6-6; and

FIG. 7 is a sectional view of the indicated portion of FIG. 5 indicated 7-7.

DETAILED DESCRIPTION OF THE PREFERRED EMBODIMENTS

Figure 1:
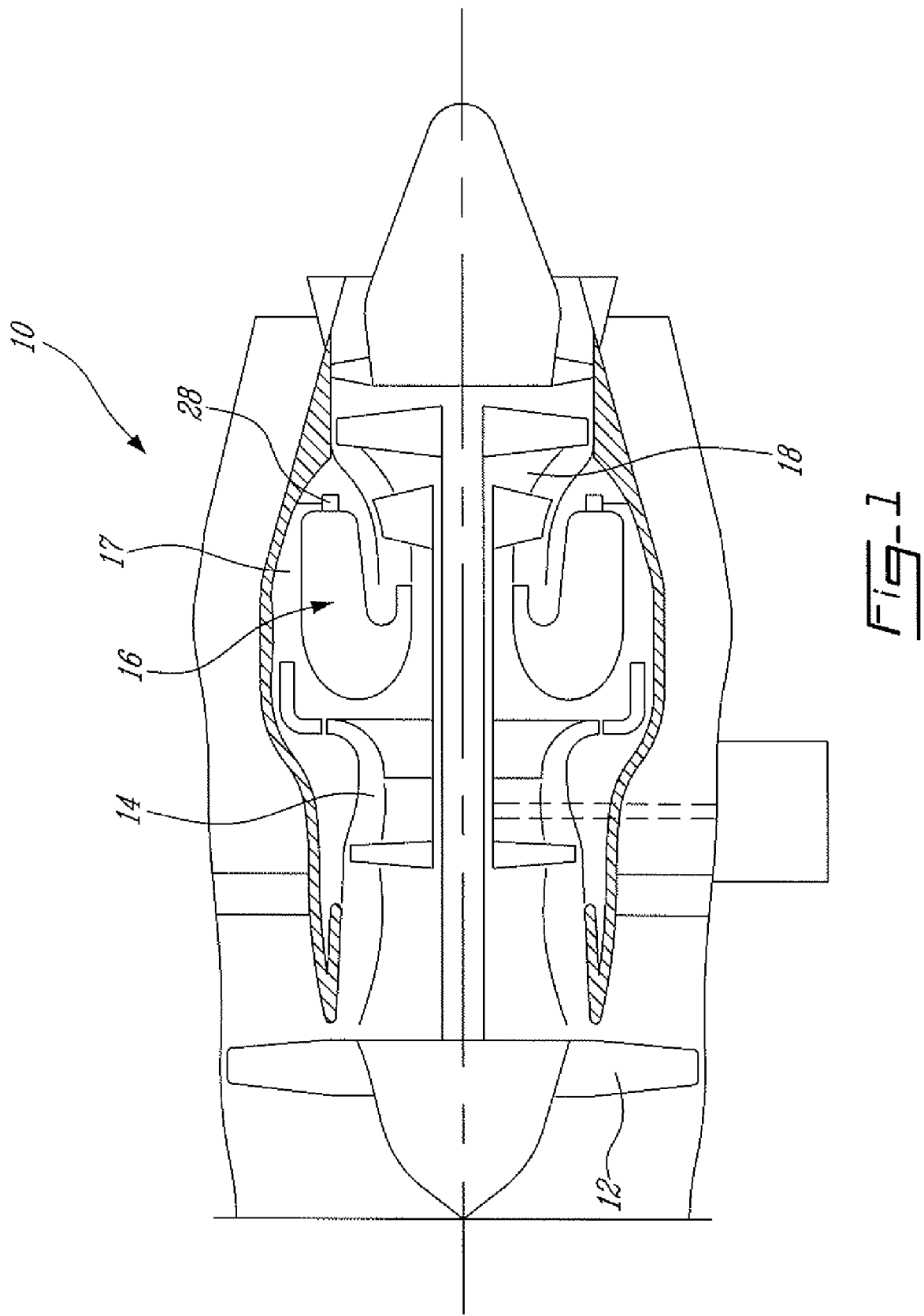
FIG. 1 is a schematic cross-sectional view of a turbofan engine having a reverse flow annular combustor and dome panel heat shields.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor 14. As shown in FIG. 2, the combustor 16 comprises a reverse flow annular combustor shell 20 composed of a radially inner liner 20a and a radially outer liner 20b, defining a combustion chamber 22. The combustor 16 has a bulkhead or inlet dome portion or panel 24 and an exit potion 26 for communicating combustion gases with the turbine section 18. As shown in FIG. 1, a plurality of fuel nozzles 28 are mounted to extend through the inlet dome end portion 24 of the combustor 20 to deliver a fuel-air mixture to the chamber 22.

A plurality of effusion holes (not shown) are preferably defined in the inner and outer liners 20a and 20b for cooling purposes, and dilution holes (not shown) are also preferably provided for combustion purposes. Inner and outer liners 20a and 20b may have any suitable configuration, and thus are shown in dotted line only in FIG. 2. The inner and outer liners 20a and 20b are preferably made out of sheet metal, though any suitable material(s) and manufacturing method(s) may be used. A thermal barrier coating (not shown) is preferably applied to the inner or combustion facing surfaces 32, 34 of the liners 20a and 20b to protect them against the high temperatures prevailing in the combustion chamber 22.

As shown in FIG. 2, the inner and outer liners 20a and 20b respectively include flanges 38 and 36 which overlap each other so as to form the dome panel 24 of the combustor shell 20 (Alternatively, any other suitable dome panel could be employed). The flanges 36 and 38 are directly fixedly secured together by a plurality of circumferentially distributed dome heat shields 40 mounted inside the combustion chamber 22 to protect the end wall of the dome 24 from the high temperatures in the combustion chamber 22. The dome heat shields 40 are typically castings made out of high temperature materials. Each dome heat shield 40 has a plurality of threaded studs 42 (four according to the example shown in FIG. 4) extending from a back face of the heat shield and through holes 44 (FIG. 3) defined in flanges 36 and 38. Self-locking nuts 46 are threadably engaged on the studs 42 from outside of the combustion chamber 22 for holding flanges 36 and 38 (and thus inner and outer liners 20a and 20b), and the dome heat shields 40 tightly together.

As shown in FIGS. 2 and 3, fuel nozzles openings 48 are defined through the dome panel 24 for allowing mounting of the fuel nozzles 28 to the combustor 16. A central hole 52 is defined in each of the heat shields 40 and is aligned with a corresponding fuel nozzle opening 48 for accommodating an associated fuel nozzle therein. As illustrated in FIG. 2, a floating collar 54 is mounted in the nozzle opening 48 to provide sealing between the combustor shell 20 and the fuel nozzles 28 while allowing relative movement therebetween. The floating collar 54 has an anti-rotation tab (not shown) which fits within an anti-rotation slot 55 on heat shield 40 (see FIG. 4.) The fuel nozzles 28 are slidably received in the floating collars 54. The floating collars 54 are axially trapped between the heat shields 40 and the end wall (i.e. flange 36) of the combustor dome 24. The fuel nozzle openings 48 are slightly oversized relative to the floating collars 54, thereby allowing limited radial movement of the collars 54 with the fuel nozzles 28 relative to the combustor shell 20.

Figure 2B:
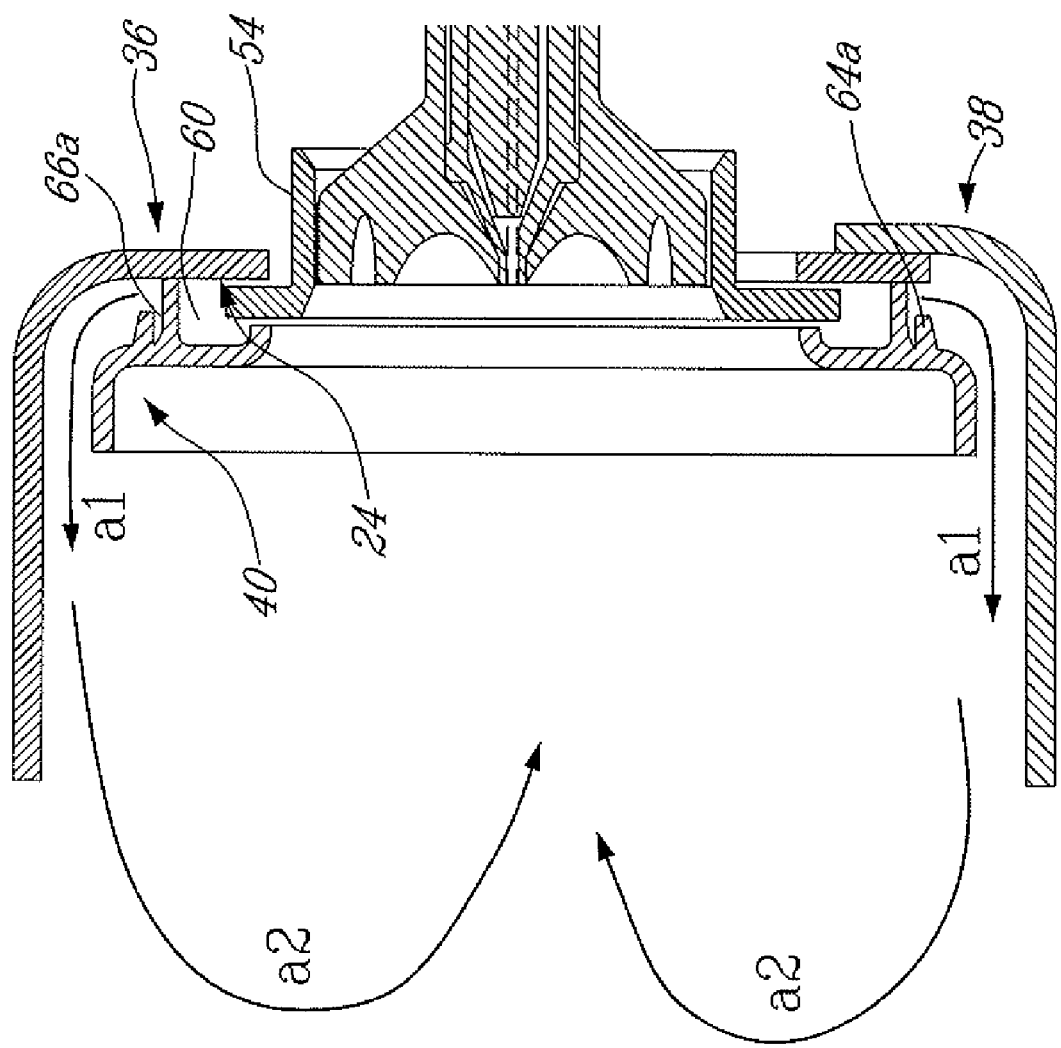
FIG. 2b is an enlarged view of FIG. 2.

As shown in FIG. 2b, the heat shields 40 are spaced from the dome panel 24 by a distance of about 0.1 inch so as to define a heat shield back face cooling air space 60. Relatively cool air from plenum 17 is admitted in the back cooling air space 60 via impingement holes 62 defined in the dome panel of the combustor shell 20 (see FIG. 3). The impingement hole patterns are arranged in the dome panel of the combustor shell 20 to optimize the heat shield cooling, in co-operation with pin fins located on the heat shield, as will be described further below. As shown in FIG. 3, the impingement holes include a first set of holes 62a arranged on two circular paths concentrically arranged with fuel nozzle opening 48. Preferably the inner circle of set 62a comprises holes equally spaced on a first pitch about the nozzle opening 48, while the outer circle of set 62a comprises only 10 holes (6 outer and 4 inner) but on a pitch similar to the first pitch. Placement of the outer circle of set 62a will be discussed further below. Holes 62b are also provided in two rows extending laterally from each side of nozzle hole 48, both rows concentric with the central axis of the annular combustor 20. Preferably the holes 62 of inner row have an angular position which is staggered relative to the holes of the outer row of the set of 62b. Preferably 8 holes are provided in the outer row, and 7 holes 62 on the inner row, in each set 62b on either side of nozzle hole 48. Though this is the preferred embodiment, other hole placements and numbers maybe used. Placement of the holes 62 of set 62b will also be discussed further below. Holes 62 are preferably straight-through holes generally perpendicular to the dome panel face, thus having an axis generally parallel to the combustor (or engine) axis. By placing holes sets 62a and 62b in circular arrays allows the holes to be laser drilled using drilling-on-the-fly (DOF) techniques, which speeds manufacturing time. As will be discussed further below, impingement holes 62 are positioned and arranged directly (i.e. generally perpendicularly) above reduced-height pin fins 64a on the back face of the heat shield to improve cooling by minimising the resistance to the air flow, which facilitates combustor cooling where a low pressure drop or gradient is available to energize combustor cooling. This allows for an optimized cooling to be achieved on the heat shield while still providing enough momentum to the air exiting from behind the heat shield to form a uniform film around the circumference of the surfaces 32 and 34 of the inner and outer liners.

Figure 4:
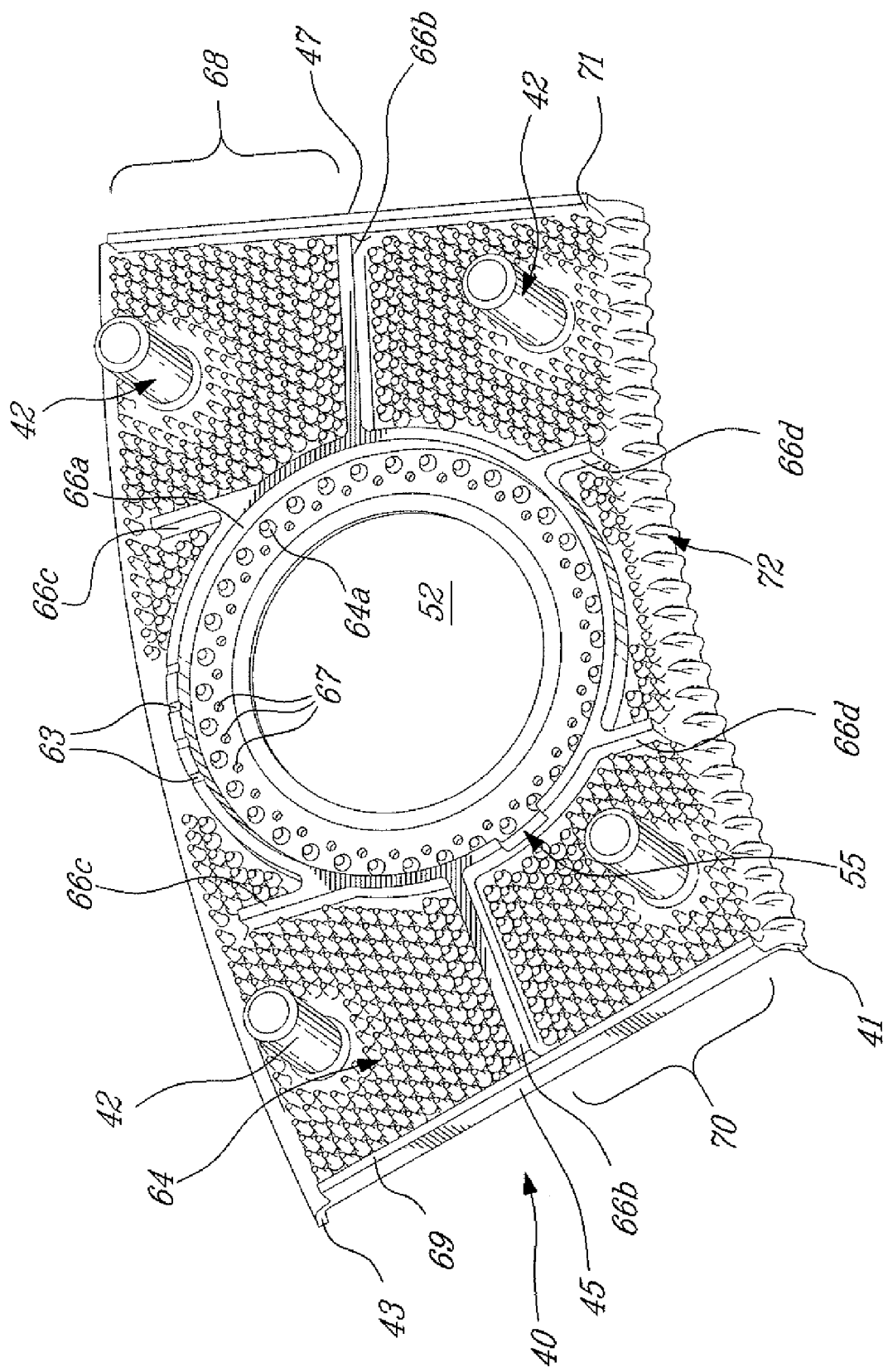
FIG. 4 is a perspective view of a back face of a dome heat shield of the combustor.
Figure 5:
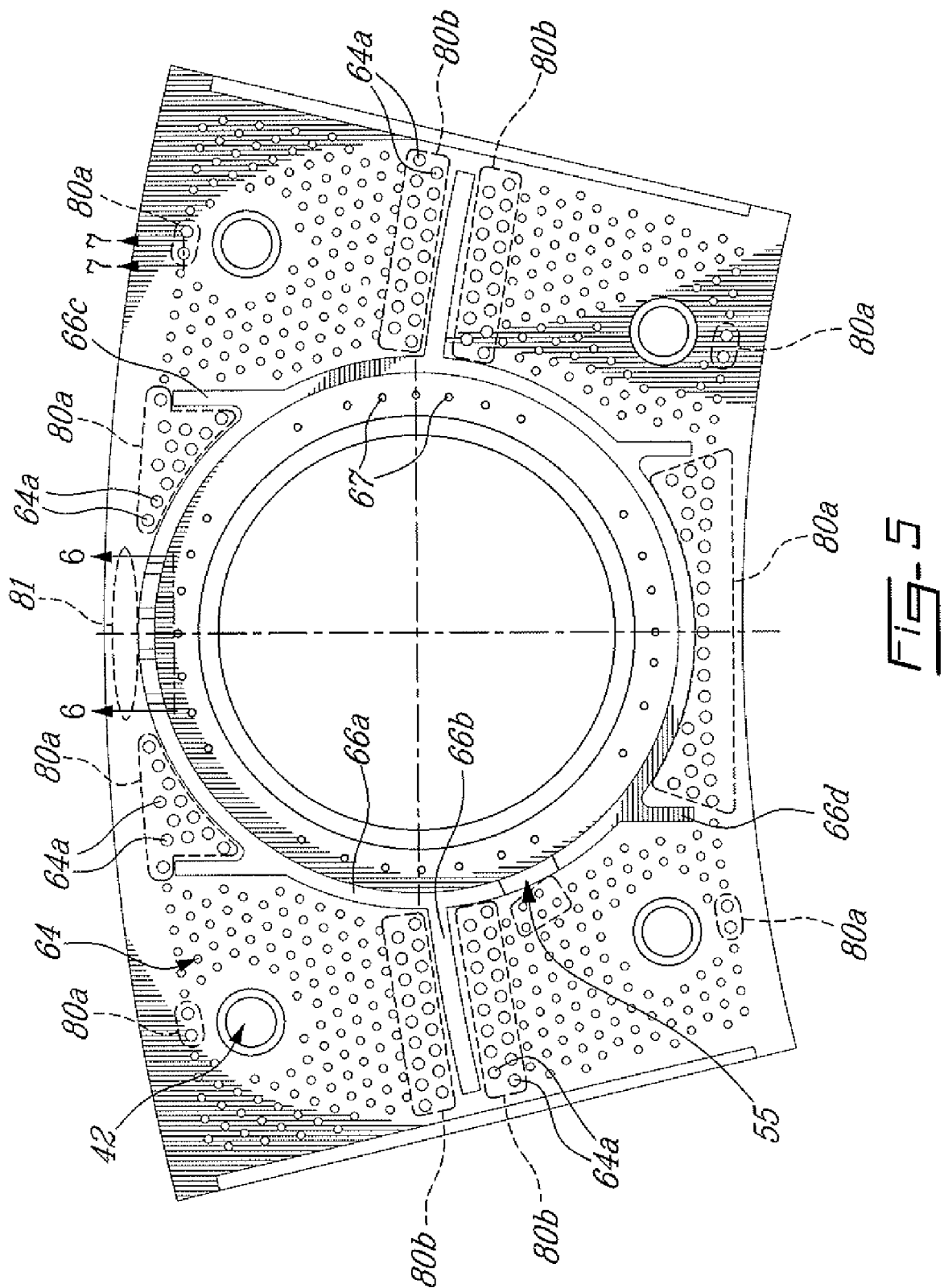
FIG. 5 is a plan view of a back face of the heat shield shown in FIG. 4.

FIGS. 4 and 5 show an individual dome heat shield 40. Each heat shield 40 is provided in the form of a circular sector having a radially inner lip 41, having a plurality of ribs 72 discussed further below, a radially outer lip 43 and lateral edges 45, 47 extending between the inner and outer lips 41 and 43. Heat exchange promoting protuberances, such as pin fins 64, pedestals or other raised cooling structures, are provided preferably in rows, and preferably in staggered position from row to row, on the back face of the heat shields 40 for augmenting the heat transfer between the back face and the cooling air. The pin fin density and location are defined based on the heat shield hot spots and to minimize the pressure drop, as will be discussed further below. As will be discussed further below, the pin fins 64 have different heights, depending on their location on the back face of the heat shield 40. The pin fin 64 height is preferably substantially the same as the distance between the heat shield back face and the inner surface of the dome panel (e.g. in this example, about 0.095" to 0.1" from the back face). The pin fin-to-pin fin spacing is based on required cooling, and in the present embodiment ranges from 0.05 inch to 0.1 inch. Each pin fin 64 preferably has a frusto-conical shape.

As shown in FIGS. 4 and 5, ribs or ridges 66 are provided extending from the back face of the heat shields 40 to strengthen the heat shield and direct the flow of cooling air as desired, as will be discussed further below. The ridges 66 preferably extend from the heat shield back face all the way into substantially sealing contact with the inner surface of the dome panel (e.g. in this example, about 0.095" to 0.1" from the back face), and thus more or less sealing engage the dome panel and thereby direct the cooling air from impingement hole sets 62a and 62b to the various regions of the heat shield, as will be described further below. The ridges 66 include a central circular ridge 66a concentrically disposed with the fuel nozzle opening 52, a pair of generally diametrically opposed primary ridges 66b extending laterally from the central circular ridge 66a, a pair of generally radially disposed ridges 66c extending radially outwardly from the central circular ridge 66a, and a pair of generally radially disposed ridges 66d extending radially inwardly from the central circular ridge 66a.

Figure 5B:
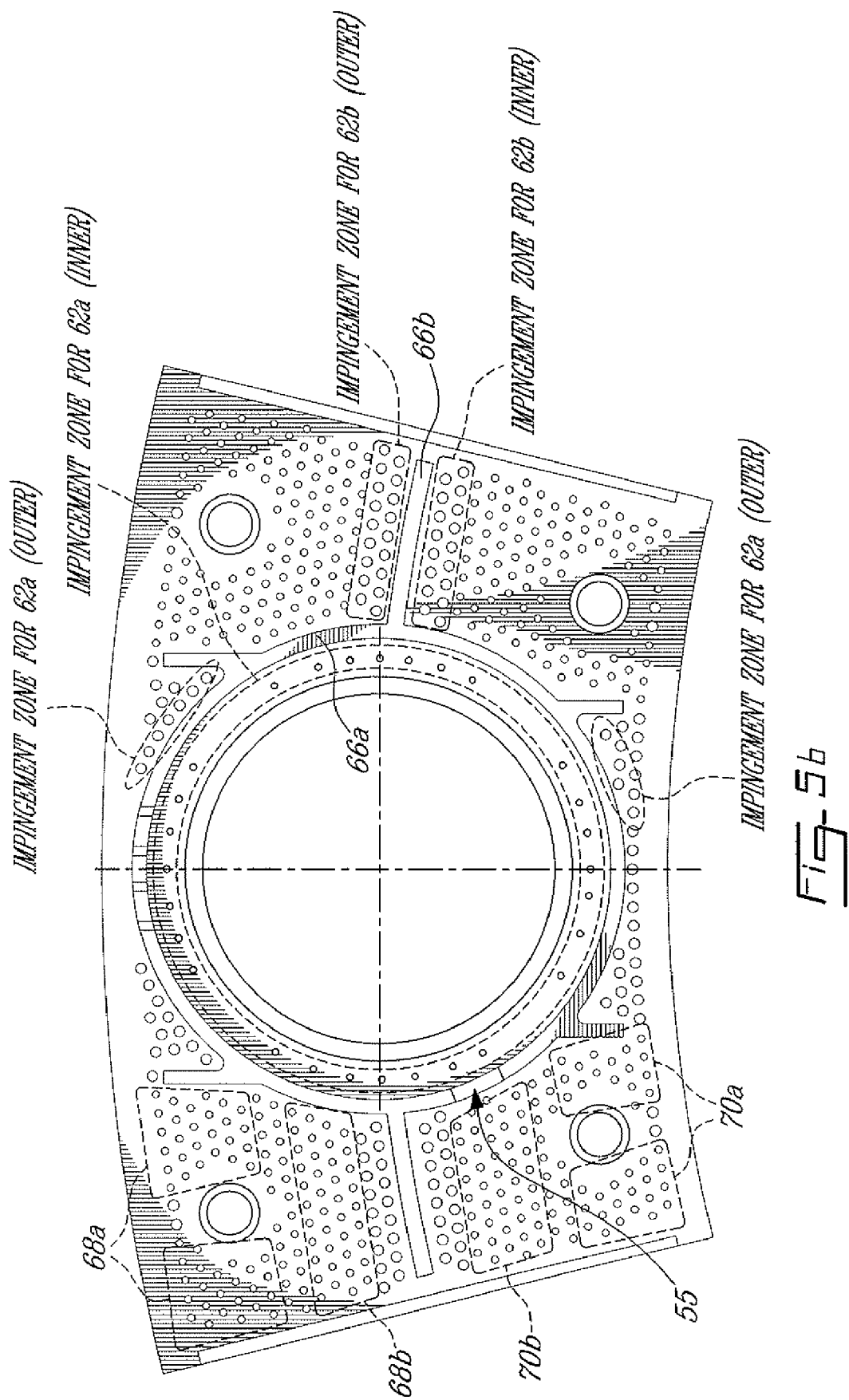
FIG. 5b is a view similar to FIG. 5a, showing impingement areas and pin fin density regions.

As shown in FIG. 2, the central circular ridge 66a preferably extends around fuel nozzle opening 52 in the heat shield in sealing contact with the inner surface of the dome panel. Referring to FIG. 5b, the areas of impingement by air passing through holes 62 of sets 62a and 62b are indicated by corresponding ellipses overlaid on the heat shield 40. As can be seen from FIG. 5b, the rows of impingement holes 62a align with one on either side of the central circular ridge 66a. Outer circle of holes 62 of set 62a generally align with the short pin fins 64a adjacent the central circular ridge 66a. Referring again to FIGS. 4 and 5, the cooling air from holes 62 of the inner circle of the set 62a impinges upon the portion of the back surface of the beat shield 40 bounded by circular ridge 66a and is then mostly directed into cooling holes 67 extending through the beat shield 40 for exhausting through the face of the heat shield. A portion of the cooling air, however, is directed through (preferably) four grooves 63 defined at the radially outer side of the heat shield through the circular ridge 66a. When mated against the combustor dome panel, the grooves 63 provide cooling holes or slots for allowing a portion of the cooling air to be discharged through the grooves 63 towards the radially outer lip 43 of the heat shield 40, as shown in FIG. 5, and thereby cool an adjacent area 81 where no pin fins 64 are provided, due to space limitations on the heat shield back face for a given dome panel and fuel nozzle geometry. Grooves 63 also permit a proper radial airflow to exit the back of the heat shield and into the combustion chamber 22 (e.g. see upper arrows a1 in FIGS. 2, 2a). The cooling air from holes 62 of the outer circle of the set 62a impinges upon the portion 80a (FIG. 5) of the back surface of the heat shield 40, and thus tends to be directed generally radially outwardly or radially inwardly, as the case may be, by the ridge 66a in co-operation with ridges 66c or 66d, as the case may be, due to the substantially sealing contact provided by the ridges 66 with the combustor dome panel. Also as shown in FIG. 4 (only), a circular array of short pin fins 64a may optionally be provided within circular ridge 66a.

Referring back to FIG. 4, ridges 66b extend laterally from the central circular ridge 66a such as to divide the back surface area of the heat shield 40 into a radially outer half 68 and a radially inner half 70 (the term "half" is used approximately). Ridges 66b preferably extend parallely to impingement holes 62 of set 62b, and disposed to be intermediate the inner and outer circle of holes 62 of set 62b, as can be seen with reference to FIG. 5b. Inner and outer circle of holes 62 of set 62b generally align with a first row of the short pin fins 64a immediately adjacent ridges 66b. Thus, the two rows (i.e. inner and outer circles) of impingement holes 62 of the set 62b in the dome panels are located one on either side of the ridges 66b. The air from impingement holes 62b impinges upon the portions 80b of the back face of the shield adjacent the ridges 66b, and thus tends to be directed generally radially outwardly or radially inwardly of the ridges 66b, as the case may be, due to the substantially sealing contact provided by the ridges 66 with the combustor dome panel.

As mentioned, the ridges 66c extend generally radially outwardly from opposed sides of the central circular ridge 66a towards, but stopping preferably short of, the radially outer lip 43. Likewise, the ridges 66d extend generally radially inwardly from opposed sides of the central circular ridge 66a towards, but stopping preferably short of, the radially inner lip 41. The ridges 66c are thus preferably generally aligned with the ridges 66d, and bound regions 80a, for radially directing cooling air in that region.

As mentioned, and shown in FIGS. 4 and 5, the heat shield 40 provided with arrays of "full height" pin fins 64 (i.e. extending substantially, but preferably not quite, the entire distance between the heat shield back face and the combustor dome panel, or about 0.090" to 0.1" in this example, and more preferably to 0.090" to 0.095"), however, in regions 80a and 80b (see FIG. 5), adjacent to ridges 66, partial height pin fins 64a are provided. Preferably, partial height pin fins 64a are about one half of the height of full-height pin fins 64, but otherwise have the same shape and configuration (i.e. preferably partial height pin fins 64a appear as a "sawed off" version of pin fins 64). The pin fin height is reduced to improve the impingement cooling effectiveness while maximizing surface area for heat transfer. The ratio ($R_{dh}$) of the diameter of cooling hole to the height from the impingement surface should preferably greater than one and less than five (i.e. $1<R_{dh}<5$) for maximum impingement cooling effectiveness. Depending on pin fin density in the impingement zone, the height from the impingement surface may be considered to be the distance from the impingement holes to either the tops of the pin fins, the heat shield back face surface, or a suitable averaging of the two. Typically, the first (pin fin tops) will be used. Thus, this desired requirement would not be met with a full-height pin fin 64, but in the current embodiment, the pin fins 64a and holes 62 can be respectively sized such that an optimum impingement height is achieved and an increased cooling surface area can still be provided in the impingement regions 80a, 80b of impingement holes 62. In the present example, the tops of reduced-height pin fins 64a are in the range of 0.045-0.055 below the impingement holes, and the impingement holes have a diameter in the range of 0.025-0.035, thus providing an $R_{dh}$ in the range of about 1.3 to 2.2 or, generally speaking, $1<R_{dh}<3$.

An area (unindicated) of pin fins 64 adjacent anti-rotation slot 55 may require height reduction to some extent, to avoid interference with the anti-rotation tab of floating collar 54.

The skilled reader will appreciate that, in general, a higher pin fin density will increase surface area, and thus generally increase heat transfer. However, in situations were insufficient flow is available to overcome the additional flow resistance provided by increased pin fin density, improvements are needed to augment heat transfer. Referring to FIG. 5b, at hot spots regions of the heat shield, such as the peripheral regions 68a and 70a, the pin fin 64 density is preferably reduced, relative to central regions 68b and 70b, to increase the heat transfer coefficients by increasing the coolant flow in these peripheral areas, by reducing flow resistance by reducing pin fin density to increase the flow. Preferably, pin fin densities in regions 68a and 70a are between 0.4 and 0.7 of the densities in regions 68b and 70b, respectively, however the exact densities will be determined based on cooling air flow and heat transfer requirements. For example, pin fin densities for regions 68a, 68b, 70a, and 70b may be 144, 250, 170, 289 respectively. Due to lower overall pressure drop experienced in the hot spot regions 68a and 70a due to lower pin fin densities, the heat transfer is optimised by directing more coolant flow through these regions than would be possible if higher densities were used. It is noted that in this example, studs 42 correspond to regions 68a and 70a, although this is not necessary.

Lateral ridges or ribs 69 and 71 are provided at lateral edges 45, 47 of each heat shield 40 provide a means for redirecting the flow of cooling air behind the heat shield away from the interface of mating sides of adjacent heat shields 40, and thus impede leakage between adjacent heat shields. The cooling air directed through impingement holes 62 or set 62b is, thus, preferably eventually fully exhausted at the inner and outer lips 41 and 43 of each heat shield 40. As shown in FIG. 4, straightener ribs 72 can be provided along the inner and outer lips 41 and 43 to straighten the cooling air flow before being discharged in the combustion chamber 22.

In use, impingement holes 62a and 62b in the combustor dome allows air to pass into the cooling air space 60 between heat shield 40 back face and the combustor dome panel. The air from combustor impingement holes 62 of sets 62a impinges upon the partial height pin fins 64a in regions 80a on the back face area of the heat shield 40 adjacent circular ridge 66a, and air from combustor impingement holes 62 of set 62b impinges upon the partial height pin fins 64a in regions 80b on the back face area of the heat shield 40 adjacent ridges 66b. The partial height pins 64a provide sufficient clearance with the dome panel such that an optimal impingement height of 2-5 times the diameter of holes 62 is provided. After impinging the partial height pins 64a, impingement air moves generally radially relative the heat shield, to move past full height pin fins 64, in the case of air provided by holes 62 of set 62b. The splashed air from impingement holes 62b is caused to flow over the pin fins towards the inner and the outer lips 41 and 43 by the ridges 66, 69 and 71. This provides effective convection cooling. The air cools the back face of the heat shields by impingement and convection heat transfer. The cooling air is eventually discharged from the space 60 behind the heat shield at the inner and outer lips 41 and 43, where the flow may be straightened by the straightener ribs 72 before being expelled into the combustion chamber 22 to travel downstream along the inner and outer liners of the combustor. Once travelling along the combustor liners, dilution holes, etc. (not shown) redirect the flow into a double toroidal flow, as indicated by arrows a1 and a2 in FIG. 2. Meanwhile, the majority of the air received within circular ridge 66a impingement cools the back face of the heat shield 40 before flowing through the holes 67, preferably to provide cooling to the upstream face of the heat shield. The remaining portion of the air received within circular ridge 66a flows through grooves 63 to cool the back face of the heat shield radially outwardly therefrom, before being discharged radially at the outer lip 43.

The above description is meant to be exemplary only, and one skilled in the art will recognize that changes may be made to the embodiments described without department from the scope of the invention disclosed. For example, the invention can be provided in any suitable heat shield configuration and in any suitable combustor configuration, and is not limited to application in turbofan engines. Still other modifications which fall within the scope of the present invention will be apparent to those skilled in the art, in light of a review of this disclosure, and such modifications are intended to fall within the appended claims.

What is claimed is:

1. A combustor and dome heat shield assembly comprising a plurality of heat shield sectors mounted adjacent and spaced apart a distance from an annular dome of the combustor, each heat shield sector having a heat shield body defined between opposed lateral edges and radially inner and outer edges, at least one fuel nozzle opening defined in the heat shield body, the heat shield body having a back face facing the combustor dome, the back face having a first plurality of protuberances extending from the back face to a first height, the first height being substantially equal to said distance, the back face having a second plurality of protuberances extending from the back face to a second height, the second height being less than the first height, the combustor having a plurality of impingement cooling holes defined through the dome, the impingement cooling holes substantially aligned with the second plurality of protuberances, wherein a ratio of a diameter of the impingement cooling holes to a height between the impingement cooling holes and tops of the second plurality of protuberances is greater than one and less than five.

2. The combustor and dome heat shield assembly defined in claim 1, wherein the ratio is greater than one and less than three.

3. The combustor and dome heat shield assembly defined in claim 1, wherein the second height is substantially one half of the first height.

4. The combustor and dome heat shield assembly defined in claim 1, wherein the protuberances are frustoconical.

5. The combustor and dome heat shield assembly defined in claim 1, wherein the plurality of impingement cooling holes are defined in at least two rows, with at least one row disposed on each of opposed sides of the fuel nozzle opening, the rows defined on an arc concentric with a central axis of the combustor.

6. The combustor and dome heat shield assembly defined in claim 5, wherein the at least two rows comprises four rows, two on each side of the fuel nozzle opening.

7. The combustor and dome heat shield assembly defined in claim 1, wherein the heat shield body further comprises at least one ridge extending from the back face, and wherein the ridge extends along the back face adjacent at least a portion of said second plurality of protuberances.

8. The combustor and dome heat shield assembly defined in claim 7, wherein the plurality of impingement holes are defined in at least two non-intersecting rows, and wherein the at least one ridge extends along the back face between the at least two non-intersecting rows of impingement holes.

9. The combustor and dome heat shield assembly defined in claim 1, wherein the second plurality of protuberances are located adjacent to ridges extending from the back face of the heat shield body.

10. The combustor and dome heat shield assembly defined in claim 1, wherein said first plurality of protuberances are provided in at least one central region and in radially peripheral regions, and wherein concentration density of said first plurality of protuberances in said at least one central region is higher than in said radially peripheral regions.

11. The combustor and dome heat shield assembly defined in claim 10, wherein two central regions are provided, separated by at least one laterally extending ridge, and wherein said radially peripheral regions comprise an inner peripheral region radially inwardly of the at least one laterally extending ridge and an outer peripheral region radially outwardly of the at least one laterally extending ridge.

12. The combustor and dome heat shield assembly defined in claim 1, wherein the back face is divided in regions by ridges projecting along said back face, said regions including radially inner corner regions and radially outer corner regions, and wherein said radially inner and radially outer corner regions are each provided with at least one row of the second plurality of protuberances adjacent the ridges separating the radially outer corners from the radially inner corners.

13. The combustor and dome heat shield assembly defined in claim 1, wherein ridges extend along the back face of the heat shield body, said ridges cooperating to direct a flow of cooling air to said radially outer and inner edges where the cooling air is discharged from the back face of the heat shield body, and wherein and array of straightener ribs is provided along at least one of said radially inner and radially outer edges.

14. The combustor dome and heat shield assembly defined in claim 1, wherein a central circular ridge extends around the at least one fuel nozzle opening on the back face of the heat shield body, said central circular ridge circumscribing a central area, and wherein a plurality of cooling holes are defined through the heat shield body in said central area.

15. The combustor and dome heat shield assembly defined in claim 14, further comprising diametrically opposed ridges running from said central circular ridge towards said opposed lateral edges, a first pair of ridges running from the central circular ridge towards the radially outer edge in a direction generally perpendicular thereto, and a second pair of ridges running from the central circular ridge towards the radially inner edge in a direction generally perpendicular thereto.

16. The combustor and dome heat shields assembly defined in claim 14, further comprising diametrically opposed ridges running from said central circular ridge towards said opposed lateral edges, and wherein the heat exchange promoting structures are arranged in rows substantially parallel to said diametrically opposed ridges.

17. The combustor and dome heat shield assembly defined in claim 1, wherein the impingement holes are arranged on circular arrays.

18. A combustor dome comprising at least one heat shield mounted to an annular dome panel, the at least one heat shield and the dome panel defining an air space therebetween and at least one fuel nozzle opening for receiving a fuel nozzle, a plurality of impingement holes defined in said dome panel for causing an impingement fluid to impinge upon a back face of the at least one heat shield, the back face having a heat exchange promoting protuberance pattern thereon, said pattern being divided in regions by ribs projecting outwardly from said back face, said ribs including a first rib extending around said fuel nozzle opening and circumscribing a central annular area and a second rib extending from opposed sides of the first rib towards lateral edges of the at least one heat shield, the heat exchange promoting protuberance pattern including first and second set of protuberances, the protuberances of the second set being shorter than the protuberances of the first set and located at least partly outwardly of the central annular area adjacent to the first rib and adjacent to the second rib on either sides thereof, wherein the impingement holes are substantially aligned with the second set of protuberances, and wherein a ratio of a diameter of the impingement holes to a height between the impingement holes and tops of the second set of protuberances is greater than one and less than five.

19. The combustor dome defined in claim 18, wherein said plurality of impingement holes comprises a first set of holes arranged in at least one circular array around the fuel nozzle opening within the first rib for causing a cooling fluid to impinge upon said central annular area, and a second set of holes circumferentially distributed about a central axis of the annular dome panel, said second set of holes being disposed outside of said at least one circular array for directing the cooling fluid upon the regions of the back face of the heat shield located outside of said first rib.

20. The combustor dome defined in claim 18, wherein the ratio is greater than one and less than three.

21. The combustor dome defined in claim 18, wherein the height of the protuberances of the second set is substantially one half of the height of the protuberances of the first set.

22. The combustor dome defined in claim 18, wherein the plurality of impingement holes are defined in at least two rows, with at least one row disposed on each of opposed sides of the fuel nozzle opening, the rows defined on an arc concentric with a central axis of the combustor dome.

23. The combustor and dome heat shield assembly defined in claim 18, wherein said first set of protuberances are provided in at least one central region and in radially peripheral regions, and wherein concentration density of said first set of protuberances in said at least one central region is higher than in said radially peripheral regions.

24. A combustor and dome heat shield assembly comprising a plurality of heat shield sectors mounted adjacent and spaced apart a distance from an annular dome of the combustor, each heat shield sector having a heat shield body defined between opposed lateral edges and radially inner and outer edges, at least one fuel nozzle opening defined in the heat shield body, the heat shield body having a back face facing the combustor dome, the back face having a first plurality of protuberances extending from the back face to a first height, the first height being substantially equal to said distance, the back face having a second plurality of protuberances extending from the back face to a second height, the second height being less than the first height, the combustor having a plurality of impingement cooling holes defined through the dome, the impingement cooling holes substantially aligned with the second plurality of protuberances, wherein the protuberances are frustoconical.

25. The combustor and dome heat shield assembly defined in claim 24, wherein the heat shield body has a central circular ridge extending around the at least one fuel nozzle opening, and wherein said heat shield body is free from cooling holes outside of the area circumscribed by the central circular ridge.

26. A combustor and dome heat shield assembly comprising a plurality of heat shield sectors mounted adjacent and spaced apart a distance from an annular dome of the combustor, each heat shield sector having a heat shield body defined between opposed lateral edges and radially inner and outer edges, at least one fuel nozzle opening defined in the heat shield body, the heat shield body having a back face facing the combustor dome, the back face having a first plurality of protuberances extending from the back face to a first height, the first height being substantially equal to said distance, the back face, having a second plurality of protuberances extending from the back face to a second height, the second height being less than the first height, the combustor having a plurality of impingement cooling holes defined through the dome, the impingement cooling holes substantially aligned with the second plurality of protuberances, wherein said first plurality of protuberances are provided in at least one central region and in radially peripheral regions, and wherein concentration density of said first plurality of protuberances in said at least one central region is higher than in said radially peripheral regions.

27. A combustor and dome heat shield assembly comprising a plurality of heat shield sectors mounted adjacent and spaced apart a distance from an annular dome of the combustor, each heat shield sector having a heat shield body defined between opposed lateral edges and radially inner and outer edges, at least one fuel nozzle opening defined in the heat shield body, the heat shield body having a back face facing the combustor dome, the back face having a first plurality of protuberances extending from the back face to a first height, the first height being substantially equal to said distance, the back face having a second plurality of protuberances extending from the back face to a second height, the second height being less than the first height, the combustor having a plurality of impingement cooling holes defined through the dome, the impingement cooling holes substantially aligned with the second plurality of protuberances, wherein ridges extend along the back face of the heat shield body, said ridges cooperating to direct a flow of cooling air to said radially outer and inner edges where the cooling air is discharged from the back face of the heat shield body, and wherein and array of straightener ribs is provided along at least one of said radially inner and radially outer edges.

28. A combustor and dome heat shield assembly comprising a plurality of heat shield sectors mounted adjacent and spaced apart a distance from an annular dome of the combustor, each heat shield sector having a heat shield body defined between opposed lateral edges and radially inner and outer edges, at least one fuel nozzle opening defined in the heat shield body, the heat shield body having a back face facing the combustor dome, the back face having a first plurality of protuberances extending from the back face to a first height, the first height being substantially equal to said distance, the back face having a second plurality of protuberances extending from the back face to a second height, the second height being less than the first height, the combustor having a plurality of impingement cooling holes defined through the dome, the impingement cooling holes substantially aligned with the second plurality of protuberances, wherein a central circular ridge extends around the at least one fuel nozzle opening on the back face of the heat shield body, said central circular ridge circumscribing a central area, and wherein a plurality of cooling holes are defined through the heat shield body in said central area, further comprising diametrically opposed ridges running from said central circular ridge towards said opposed lateral edges, a first pair of ridges running from the central circular ridge towards the radially outer edge in a direction generally perpendicular thereto, and a second pair of ridges running from the central circular ridge towards the radially inner edge in a direction generally perpendicular thereto.

29. A combustor and dome heat shield assembly comprising a plurality of heat shield sectors mounted adjacent and spaced apart a distance from an annular dome of the combustor, each heat shield sector having a heat shield body defined between opposed lateral edges and radially inner and outer edges, at least one fuel nozzle opening defined in the heat shield body, the heat shield body having a back face facing the combustor dome, the back face having a first plurality of protuberances extending from the back face to a first height, the first height being substantially equal to said distance, the back face having a second plurality of protuberances extending from the back face to a second height, the second height being less than the first height, the combustor having a plurality of impingement cooling holes defined through the dome, the impingement cooling holes substantially aligned with the second plurality of protuberances, wherein a central circular ridge extends around the at least one fuel nozzle opening on the back face of the heat shield body, said central circular ridge circumscribing a central area, and wherein a plurality of cooling holes are defined through the heat shield body in said central area, further comprising diametrically opposed ridges running from said central circular ridge towards said opposed lateral edges, and wherein the heat exchange promoting structures are arranged in rows substantially parallel to said diametrically opposed ridges.

* * * * *